Dec. 23, 1969  A. C. SCHAFFNER  3,485,744
ZIRCONIUM ELECTRODE FOR ELECTRO-CHEMICAL MACHINING
Filed Nov. 21, 1966

WITNESSES
Robert C. Baird
Lee P. Johns

INVENTOR
Alfred C. Schaffner.
BY
Frederick Hoover
ATTORNEY

United States Patent Office 3,485,744
Patented Dec. 23, 1969

3,485,744
ZIRCONIUM ELECTRODE FOR ELECTRO-
CHEMICAL MACHINING
Alfred C. Schaffner, Pittsburgh, Pa., assignor to Westinghouse Electric Corporation, Pittsburgh, Pa., a corporation of Pennsylvania
Filed Nov. 21, 1966, Ser. No. 595,967
Int. Cl. B23p 1/02; B01k 3/04
U.S. Cl. 204—290    5 Claims

ABSTRACT OF THE DISCLOSURE

An electro-chemical machining apparatus including a tubular electrode composed of one of the metals: aluminum, titanium, hafnium, tantalum, zirconium, and base alloys thereof; and a thin, adherent autogenous coating of the oxide of the metal of the tubular electrode on the electrode, which coating is electrically insulating.

---

This invention relates generally to electro-chemical machining apparatus having a tubular electrode composed of zirconium having a thin, adherent, autogenous oxide coating as a surface electrical insulation.

Electro-chemical machining is the removal of a surface portion of a metal workpiece by electrolytic technique and is disclosed in Patent No. 3,058,895. Essentially electrochemical machining is a depleting process in which the workpiece is in effect the anode of an electrolytic cell operating at a relatively high current density.

Most of the disadvantages of mechanical machining for shaping metals including toolwear, burring, overheating, and distortion due to dimensional changes in a finished surface are avoided by electro-chemical machining. However, other problems are incurred by conventional procedures of electro-chemical machining and electrodes for forming a hole in a metal workpiece have not been completely satisfactory.

U.S. Patent No. 3,120,482 discloses a tubular electrode for sinking holes in a workpiece. For such a purpose the tubular electrode is necessarily provided with an electrically insulating coating on the outer surface which coating is composed of a ceramic material or an epoxy resin. For practical purposes the coating must have a thickness of .007 inch or greater. Several disadvantages are obtained from a metal tube electrode having a coating of insulating material composed of ceramic or epoxy resin or other compounds which are not an inherent part of the metal tube. For example, the insulating material around the tube must have a minimum thickness in order to have good adhesion to the metal tube and good film strength.

Where the size of a hole to be sunk by electro-chemical machining is of primary importance, the difficulty of determining the proper diameter of the electrode aggravates the problem which involves such other factors as the relationships between rate of penetration, current density, applied voltage, and other parameters. Of primary importance, however, is the maintenance of the insulating coating material and preventing its separation from the metal tube such as by action of the electrolyte and heat during use of the electrode.

It has been found in accordance with the invention that the foregoing problems may be overcome by providing an electrode composed of the metal zirconium and having a thin adherent film of zirconium oxide which film is highly electrically resistant, which oxide is formed by self-oxidation of the zirconium metal.

Accordingly, it is a general object of this invention to provide a zirconium electrode for electro-chemical machining.

It is another object of this invention to provide a zirconium electrode for electro-chemical machining which electrode is tubular and has a thin adherent coating of zirconium oxide formed by self-generation of the metal tube.

It is another object of this invention to provide a zirconium electrode for electro-chemical machining which electrode has an outer adherent film of zirconium oxide which is highly resistant to electrical conductivity.

It is another object of this invention to provide a zirconium electrode for electro-chemical machining processes including cavity sinking, deburring and surfacing.

Finally, it is an object of this invention to accomplish the foregoing objects and desiderata in a simple and effective manner.

Briefly, the present invention provides an electrode for electrolytic machining comprising an elongated metal tube, means for mounting the tube and for supplying electrolyte under pressure thereto, the tube being composed of a metal selected from the group consisting of zirconium and zirconium base alloys, a thin adherent surface film of zirconium oxide on the outer surface of the tube as a product of self-oxidation, and the oxide being electrically insulating to the passage of current therethrough.

For a better understanding of the invention, reference is made to the drawings, in which.

Similar numerals refer to similar parts throughout the several views of the drawing.

Figure 1:
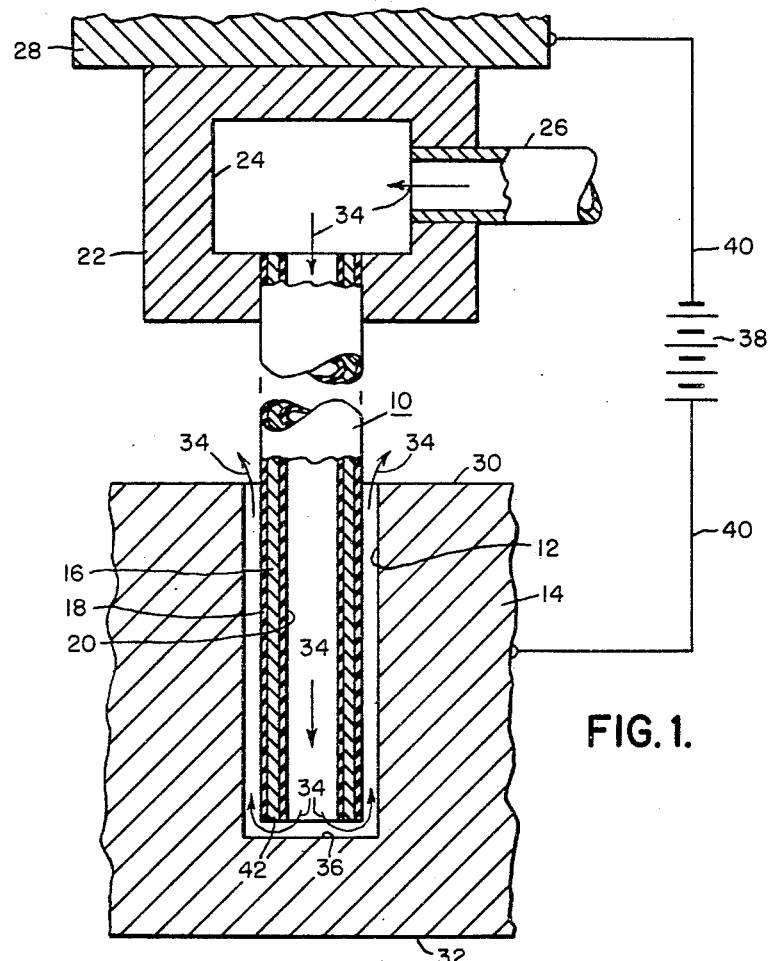
FIGURE 1 is a longitudinal sectional view showing a tubular electrode partially penetrating a workpiece by drilling a hole therethrough.
Figure 2:
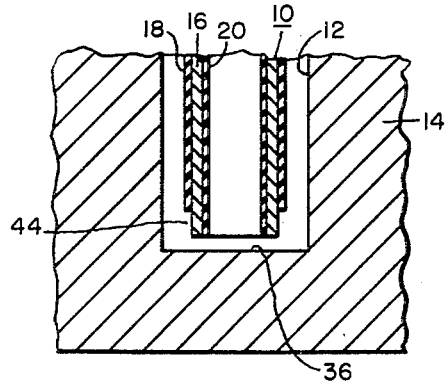
FIG. 2 is a fragmentary sectional view of another embodiment of the lower end of the electrode.

In the drawing an electrode 10 is positioned for drilling a hole 12 in a workpiece 14. The workpiece is composed of metal. The electrode 10 includes a metal tube 16 having an outer coating 18, an inner coating 20, and having the upper end fixedly secured to a fitting 22. The interior of the fitting 22 includes a chamber 24 which communicates with a conduit 26. The upper side of the fitting 22 is fixedly secured to a member 28 as part of an electrochemical machining device.

Generally, the hole 12 is drilled or machined through the workpiece 14 from the upper end to the lower end 30 and 32 by the process of depleting in which the workpiece 14 is in effect the anode of an electrolytic cell operating at a relatively high current density. For that purpose an electrolyte is introduced into the tube 16 via the conduit 26 from the chamber 24 as indicated by the arrows 34. At the lower end 36 of the hole 12 the electrolyte leaves the tube 16 and rises in the gap or clearance space between the coating 18 of the tube and the surface of the hole 12.

The tube 16 is composed of a metal selected from a group consisting of aluminum, titanium, zirconium, hafnium, tantalum, and base alloys thereof. The preferred metal is zirconium and zirconium base alloys. As pointed out hereinafter in detail, zirconium oxides are exceptionally adherent and have other properties that make the zirconium electrode outstandingly effective. The electrode 10 is preferably in the form of a tube of circular cross section although any other shape or size such as rectangular may suffice. The shape of the hole 12 necessarily dictates the shape of the electrode 10.

The tube 16 is electrically insulated from the surface of the hole 12 by a coating 18 on the outer surface of the tube. The tube 16 is composed of zirconium or zirconium base alloy. The coatings 18 and 20 are composed of zirconium oxide in situ of homogeneous composition. The coatings 18 and 20 are of uniform thickness throughout the length of the tube 16 to prevent the electrode 10 from hanging up in the hole 12 during the cutting operation.

A thin (less than 1 mil) coating of zirconium oxide as produced on the electrodes is a dense, strongly adherent, and dielectrically compact film which serves as a dielectric barrier or layer between the zirconium base tube 16 and the metal surface forming the hole 12. Zirconium oxide has a dielectric constant of $.25 \times 10^{10}$ ohms/cm. at 175° F. The film is extremely tough and tenacious, and envelops the parent metal as a uniformly thick layer. The film may have a thickness ranging from about 0.5 to $30 \times 10^{-6}$ inch and is preferably about $1 \times 10^{-6}$ inch thick, the thickness depending upon how it is made.

These oxide coatings of aluminum, titanium, zirconium, hafnium, tantalum, and base alloys, are formed on their respective metal surfaces and adhere tenaciously and will be effective.

The overall diameter of the electrode 10 may vary from about ⅛ to ½ inch depending upon the size of the hole 12 to be drilled.

Inasmuch as the coating 18 has a relatively small thickness (about $10^{-6}$ inch) (which is several magnitudes lower than the minimum of a coating of about 0.007 inch thickness composed of ceramic or epoxy resin such as disclosed in Patent No. 3,120,482), considerations of the relationship between the diameter of the hole and that of the electrode 16, the amount of clearance between the electrode and the wall of the hole, as well as the velocity of the electrolyte are minimized. A serious problem with electrodes having externally applied coatings, such as ceramic and epoxy resin, which are not self-regenerated such as by oxidation of the metal surface, is that the externally applied coatings are eroded away by the pressurized electrolyte as it moves upwardly from the lower end of the electrode to the top of the hole, or deteriorate with heat generated at the electrode, and in a relatively short period of use the electrode is rendered unsatisfactory.

A satisfactory self-generated oxide coating may be produced in a number of ways including a thermal method (1) and an electrolytical method (2) such as by anodizing. The thermal method (1) for applying a coating of zirconium oxide to the surfaces of a tube composed of zirconium or zirconium base alloy includes placement of such a tube into an autoclave and subjecting the tube to a steam or hot water treatment in a manner similar to testing a zirconium tube for corrosion resistance. In the hot water test, the pressure used is generally that of steam in equilibrium with the water phase at the temperature in question usually 650° F. at 2800 p.s.i.g. for 3½ days. The steam test is usually run at 750° F. at 1500 lbs./sq. inch for 14 days. Either procedure, steam or hot water, will develop a zirconium oxide ($ZrO_2$) film on the tube 16 which is extremely dense, tenacious, and adherent to the tube. The coating has a thickness of about $2.2 \times 10^{-6}$ inch for 3½ day treatment and $4.8 \times 10^{-6}$ inch for the 14 day treatment and is applied to the inside as well as the outside of the tube.

The electrolytic or anodizing method (2) for applying an oxide involves the process of passing a current through an electrolyte in which a metal anode is employed for example, aluminum. In an aqueous solution containing sulfates, chromates or the like, the anions consist in part of oxygen which unite chemically with the aluminum to form a highly adherent, homogeneous oxide film. The film thickness varies with the electrolyte and operating conditions such as the temperature and the time, so that the thickness may vary from less than $0.5 \times 10^{-6}$ to about $5 \times 10^{-6}$ inch and more.

The resistivity of an electrode 10 of zirconium having a diameter of about a quarter of an inch with an oxide film of about $1 \times 10^{-6}$ inch is about $.25 \times 10^{10}$ ohms/cm.

In operation, a hole 12 is made in the metal workpiece 14 by bringing the lower end of the electrode 10 into contact with the upper side 30 and flowing an electrolyte such as salt water through the electrode under a pressure of about from 100 to 150 p.s.i. A direct current ranging from about 400 to 1000 amperes/sq. inch is applied by means such as a battery or source 38 of DC power and lead wires 40 whereby current passes through the electrode 10 to the workpiece 14 as the electrode moves downwardly through the workpiece. The preferred current density is about 600 amperes/sq. inch. For that purpose the lower end 42 of the tube 16 is exposed and not coated with the oxide film 18 or 20. In that manner current flows from the end of the tube to the lower end surface of the hole 12 through the electrolyte indicated by the arrows 34.

To facilitate the action at the lower end of the hole 12 the lower end portion of the outer coating 18 may be removed so as to leave an exposed lower end portion 44 of the tube 16. Accordingly, a greater portion of the metal tube 16 is exposed for the passage of current from the electrode 10 to the lower end 36 of the hole 12 and in addition current also passes through the electrolyte to the wall of the hole 12 thereby making larger bore for a given electrode diameter. As a result the clearance between the electrode and the wall of the hole 12 is slightly greater and there is less likelihood of the electrode becoming hung up or contacting the wall as the electrode advances through the workpiece.

Figure 3:
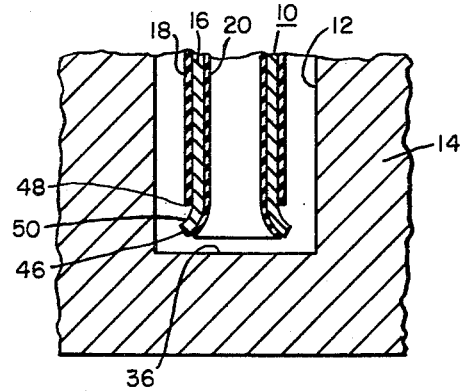
FIG. 3 is a fragmentary sectional view of another embodiment of the lower end of the electrode.

Still another embodiment of the invention is shown in FIG. 3 in which a lower end portion 46 is flared outwardly slightly in order to expedite the electrolytic action between the lower end portion of the tube 16 and the bottom wall 36 of the hole 12. For that purpose the lower end of the outer coating 18 may be terminated at 48 to provide an exposed lower end portion 50 of the tube 16. The outturned portion or lip 46 widens the diameter of the cut or hole 12 although more current and time is required for that purpose.

The voltage range during the operation is from about 8 to 16 volts with a preferred voltage of 12 volts.

An advantage of the outturned portion 46 together with the larger gap or clearance between the electrode 10 and the wall of the hole 12 is that the electrolyte has more space to move in and thereby minimizes the erosive effect on the surface of the outer coating 18. As a result the electrode has greater durability.

Accordingly, the present invention provides an electrode for electrolytically machining a hole through a metal workpiece which is composed of a metal having its own self-induced insulating oxide film and thereby avoids the necessity of preparing and applying and maintaining an electrode of another metal which does not have the property of forming a protective oxide which is also electrically insulating for use as an electrode. Moreover, although zirconium is the metal described in the foregoing description in a similar way tubes of other metals such as aluminum, titanium, hafnium, and tantalum may also be used because such metals can be provided with a thin, tenacious, pore-free, high dielectric resistant oxide coating or film.

It is understood that the above specification and drawings are merely exemplary and not in limitation of the invention.

What is claimed is:

1. An electrode for electrolytically sinking a hole in a metal workpiece comprising solely an elongated tube, means attached to one end of the tube for supporting the tube and for supplying electrolyte under pressure thereto, the tube being composed of a metal selected from the group consisting of aluminum, titanium, hafnium, tantalum, zirconium, and base alloys thereof, a thin adherent preformed autogenous surface film of the oxide of the metal on the tube surface and constituting an integral part thereof, the preformed film being a product of oxidation of the tube and being electrically insulating, and the working tip at the other end of the tube being free of the oxide film.

2. The electrode of claim 1 in which the film is composed of a metal selected from the group consisting of zirconium and zirconium base alloys.

3. The electrode of claim 1 in which the film has a thickness of up to $3 \times 10^{-6}$ inch.

4. The electrode of claim 1 in which the film has a thickness of from about $0.5 \times 10^{-6}$ to $10^{-6}$ inch.

5. The electrode of claim 1 in which the film has a thickness of about $10^{-6}$ inch.

References Cited

UNITED STATES PATENTS

| 1,970,804 | 8/1934 | Kerk. | |
| 2,390,282 | 12/1945 | Tour et al. | 204—292 |
| 2,417,461 | 3/1947 | Becker | 117—221 |
| 2,960,642 | 11/1960 | De Rudnay | 117—221 XR |
| 3,058,895 | 10/1962 | Williams | 204—224 |
| 3,278,411 | 10/1966 | Williams | 204—290 |

JOHN H. MACK, Primary Examiner

D. R. JORDAN, Assistant Examiner

U.S. Cl. X.R.

204—224